US008538024B2

(12) United States Patent
Rose (10) Patent No.: US 8,538,024 B2
(45) Date of Patent: *Sep. 17, 2013

(54) METHOD AND APPARATUS FOR INITIALIZING A NEW STREAM CIPHER DURING HANDOFF

(75) Inventor: Gregory G. Rose, Mortlake (AU)

(73) Assignee: QUALCOMM Incorporated, San Diego, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 11/615,794

(22) Filed: Dec. 22, 2006

(65) Prior Publication Data

US 2008/0013730 A1    Jan. 17, 2008

Related U.S. Application Data (63) Continuation of application No. 10/874,765, filed on Jun. 22, 2004, now Pat. No. 7,158,640, which is a continuation of application No. 09/438,341, filed on Nov. 11, 1999, now Pat. No. 6,771,776.

(51) Int. Cl.
*H04L 29/06* (2006.01)

(52) U.S. Cl.
USPC ........... 380/272; 380/260; 713/171; 455/411; 455/436

(58) Field of Classification Search
USPC ........... 380/37, 258–260, 262, 270, 272–274, 380/278; 713/171; 455/411, 436–438
See application file for complete search history.

(56) References Cited

U.S. PATENT DOCUMENTS

| | | | |
|---|---|---|---|
| 4,901,307 A | | 2/1990 | Gilhousen et al. |
| 5,060,266 A | | 10/1991 | Dent |
| 5,081,679 A | | 1/1992 | Dent |
| 5,103,459 A | | 4/1992 | Gilhousen et al. |
| 5,239,294 A | * | 8/1993 | Flanders et al. ............. 340/5.74 |
| 5,243,653 A | | 9/1993 | Malek et al. |
| 5,267,261 A | | 11/1993 | Blakeney, II et al. |
| 5,325,419 A | * | 6/1994 | Connolly et al. .......... 455/435.1 |
| 5,778,075 A | | 7/1998 | Haartsen |
| 5,805,992 A | | 9/1998 | Schellinger |
| 5,870,474 A | * | 2/1999 | Wasilewski et al. .......... 380/211 |
| 5,995,625 A | * | 11/1999 | Sudia et al. ..................... 705/51 |
| 6,052,786 A | | 4/2000 | Tsuchida |
| 6,510,228 B2 | | 1/2003 | Rose |
| 6,771,776 B1 | | 8/2004 | Rose |
| 7,158,640 B2 | | 1/2007 | Rose |

OTHER PUBLICATIONS

International Search Report—PCT/US00/031198, International Search Authority—European Patent Office—Jul. 20, 2001.

(Continued)

*Primary Examiner* — Darren B Schwartz
*Assistant Examiner* — John B King
(74) *Attorney, Agent, or Firm* — Won Tae Kim (57) ABSTRACT

A method and apparatus for re-synchronizing a stream cipher during soft handoff. Transmitted quasi-secret keying information is used with a secret key to reinitialize a stream cipher generator located in a base station and a stream cipher generator located in a travelling mobile station. Since the quasi-secret keying information is uniquely determined according to each base station in the wireless telephone system, a base station's quasi-secret keying information and a shared secret key can also be used to create a new key. Thus, as the mobile station travels from one base station to another base station, a unique new key is generated for each base station.

9 Claims, 5 Drawing Sheets

(56) References Cited

OTHER PUBLICATIONS

Written Opinion—PCT/US00/031198. International Preliminary Examination Authority—US Patent Office—Sep. 5, 2001.

International Preliminary Examination Report—PCT/US00/031198, International Preliminary Examination Authority —US Patent Office—Sep. 26, 2002.

* cited by examiner

METHOD AND APPARATUS FOR INITIALIZING A NEW STREAM CIPHER DURING HANDOFF

CROSS-REFERENCE TO RELATED APPLICATIONS

The present Application for Patent is a continuation of patent application Ser. No. 10/874,765 entitled "Method and Apparatus for Re-Synchronization of a Stream Cipher During Handoff" filed Jun. 22, 2004 (now U.S. Pat. No. 7,158,640), which application is a continuation of patent application Ser. No. 09/438,341 entitled "Method and Apparatus for Re-Synchronization of a Stream Cipher During Handoff" filed Nov. 11, 1999 (now U.S. Pat. No. 6,771,776).

BACKGROUND OF THE INVENTION

I. Field of the Invention

The present invention relates to encryption. More particularly, the present invention relates to a method and apparatus for re-synchronizing encryption stream ciphers.

II. Background

Encryption is a process whereby a random process manipulates data such that the data is made unintelligible by all but the intended recipient. One method of encryption for digitized data is through the use of stream ciphers, which are generated by secret keys. A widely used secret key system is the Data Encryption Standard (DES) which employs a 56 bit key and 8 non-key parity bits. DES was published as a U.S. Federal Information Processing Standard in 1977. In an encryption scheme using a stream cipher, data and a stream of pseudo-random bits (or encryption bit stream) are combined, usually with the exclusive-or (XOR) operation. Many of the techniques used for generating the stream of pseudo-random numbers are based on linear feedback shift registers over a Galois finite field. The register is updated by shifting a new bit into the register, shifting the other bits over by one bit position, and calculating a new output bit. Decryption is simply the process of generating the same encryption bit stream and removing the encryption bit stream with the corresponding operation from the encrypted data. If the XOR operation was performed at the encryption side, the same XOR operation is also performed at the decryption side. For a secured encryption, the encryption bit stream must be computationally difficult to predict.

An exemplary application that utilizes stream ciphers is wireless telephony. An exemplary wireless telephony communication system is a code division multiple access (CDMA) system. The operation of a CDMA system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein. The CDMA system is further disclosed in U.S. Pat. No. 5,103,459, entitled SYSTEM AND METHOD FOR GENERATING SIGNAL WAVEFORMS IN A CDMA CELLULAR TELEPHONE SYSTEM, assigned to the assignee of the present invention, and incorporated by reference herein. Another CDMA system includes the GLOBALSTAR communication system for worldwide communication utilizing low earth orbiting satellites. Other wireless telephony systems include time division multiple access (TDMA) systems and frequency division multiple access (FDMA) systems. The CDMA systems can be designed to conform to the "TIA/EIA/IS-95 Mobile Station-Base Station Compatibility Standard for Dual-Mode Wideband Spread Spectrum Cellular System," hereinafter referred to as the IS-95 standard. Similarly, the TDMA systems can be designed to conform to the TIA/EIA/IS-54 (TDMA) standard or to the European Global System for Mobile Communication (GSM) standard.

Encryption of digitize voice data in wireless telephony has been hampered by the lack of computational power in the remote station. This has led to weak encryption processes such as the Voice Privacy Mask used in the TDMA standard or to hardware generated stream ciphers such as the A5 cipher used in the GSM standard. The disadvantages of hardware-based stream ciphers are the additional manufacturing cost of the hardware and the longer time and larger cost involved in the event the encryption process needs to be changed. Since many mobile stations in wireless telephony systems and digital telephones comprise a microprocessor and memory, a stream cipher that is fast and uses little memory is well suited for these applications.

However, a problem arises in the use of stream ciphers in a wireless telephone system. A mobile station can travel from the range of a first base station to a second base station throughout the wireless telephone system. While the mobile station is travelling within the range of the system, the mobile station communicates with the base station from which the mobile station receives the strongest signal. It should be noted that a mobile station can detect the broadcasts of multiple base stations, not just the two base stations that are used herein for illustrative purposes. In most instances, the strength of a transmission signal is directly proportional to the distance between the mobile station and the base station. As the mobile station enters the range of a second base station, the mobile station begins communications with the second base station while concurrently maintaining communications with the first base station. The process in which the mobile station establishes communications with the second base station while ending communications with the first base station is called a "soft handoff," and is described in U.S. Pat. No. 5,267,261, entitled "MOBILE STATION ASSISTED SOFT HANDOFF IN A CDMA CELLULAR COMMUNICATIONS SYSTEM," which is assigned to the assignee of the present invention, and incorporated by reference herein. If the mobile station is in the midst of a secure, encrypted data exchange with the first base station during handoff, it is necessary to re-synchronize the stream cipher so that the second base station and the mobile station can communicate securely without an interruption in the handoff process.

In order to achieve this goal, the second base station must be able to encrypt and decrypt in the same manner as the first base station. Hence, the second base station must have the state information or the synchronization parameters of the first base station. One simple method of re-synchronizing the stream cipher at the second base station is to pass information about the state of the encryption process from the first base station to the second base station through the wireless telephone system. However, the process of passing state information from one base station to another is problematic. If there is no mechanism for passing state information in a secure manner, the state information can be intercepted by unintended recipients and can then be used to compromise the security of the encrypted transmissions between the mobile station and the second base station.

Another simple method of re-synchronizing the stream cipher is to have both the mobile station and the second base station restart the entire encryption process from the same initial state as used by the mobile station and the first base station. However, this method results in a reused stream cipher, which is insecure. Thus, there is a need for a method that will provide secure resynchronization of a stream cipher while a mobile station is travelling within the range of a first base station to a second base station.

SUMMARY

The present invention is directed to a method and apparatus for securely re-synchronizing a stream cipher while a mobile station is travelling from the range of a first base station to a second base station. In one aspect of the invention, a secret key and a unique non-secret key are used to reinitialize the stream cipher used by the mobile station. (The unique non-secret key can also be referred to as a quasi-secret key.) A quasi-secret key is transmitted from a first base station to a second base station and the second base station uses the quasi-secret key and a secret key to initialize a stream cipher generator. Hence, both the mobile station and the second base station will start generating the stream cipher from the same initial state.

In another aspect of the invention, a secret key and a quasi-secret key are used to create a new key. During a soft handoff process, a quasi-secret key is transmitted from a first base station to a second base station. The second base station uses the quasi-secret key and a secret key to generate a new key. The mobile station and the second base station use the new key to generate a new stream cipher for encrypting the data stream flowing between the mobile station and the second base station.

DETAILED DESCRIPTION OF THE PREFERRED EMBODIMENTS

Stream ciphers are a method of encryption based upon the independent generation of identical streams of pseudo-random bits at a transmission end and a receiving end. These pseudo-random bits are reversibly combined with a data stream to produce an encrypted data stream.

Figure 1:
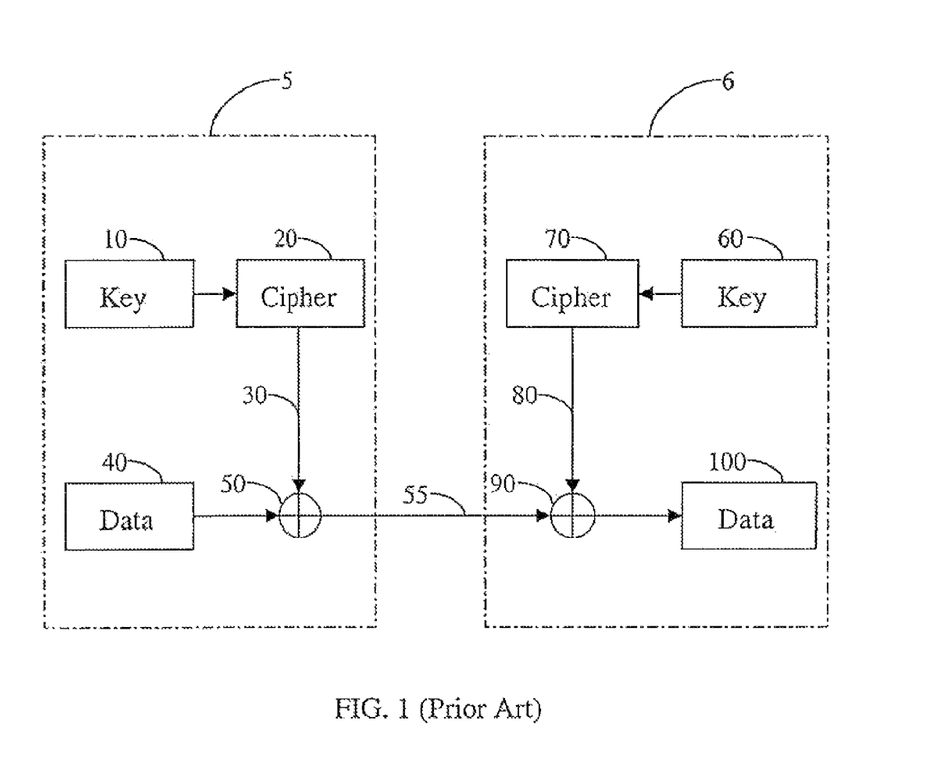
FIG. 1 is a block diagram of a conventional stream cipher encrypting a data stream and then decrypting a data stream.

FIG. 1 diagrams a process of encrypting a data stream 40 at a transmission end 5 and decrypting the encrypted data stream 55 at a receiving end 6. At the transmission end 5, a secret key 10 is used by a cipher generator 20 to generate a stream cipher 30. The stream cipher 30 is combined with the data stream 40 through a XOR operation 50. The output of the XOR operation 50 is encrypted data 55 ready for transmission to the receiving end 6. A secret key 60 at the receiving end 6, which is the same as secret key 10 at the transmission end 5, is used by a cipher generator 70 to generate a stream cipher 80. The stream cipher 80 is combined with encrypted data 55 through a XOR operation 90 to produce decrypted data 100.

As understood by those of skill in the art, the XOR operation is used in this description of the embodiment because the XOR operation is a self-inverse operation. However, it should be noted that any invertable operation can be used in this process, such as an addition operation on the transmission end 5 combined with a subtraction operation on the receiving end 6.

For the encryption and decryption process of FIG. 1 to work, there must be synchronization between the transmission end 5 and the receiving end 6. Each bit of the encrypted data stream must be XORed with the correct, corresponding bit of the stream cipher. Otherwise, the output will not correspond to the original data.

In some circumstances, restarting or regenerating the stream cipher at the receiving end 6 requires an avoidable use of system resources. One method of generating stream ciphers efficiently is disclosed in U.S. patent application Ser. No. 08/934,582, filed Sep. 22, 1997, entitled "METHOD AND APPARATUS FOR GENERATING ENCRYPTION STREAM CIPHERS," assigned to the assignee of the present invention, and incorporated by reference herein.

In one embodiment of the invention, a stream cipher can be generated with a linear feedback shift register. A linear feedback shift register holds a current state that consists of k elements from some finite field. If the starting states (derived directly from the shared secret key) are known and the number of times by which the linear feedback shift registers have been cycled is also known, then the registers can be updated to the state to which the encrypted data stream currently corresponds.

When a register is cycled, a new element of the register is calculated as a linear function of the existing elements, according to a recurrence relation over the Galois field:

$$Sn+k = Ck-1 Sn+k-1 + Ck-2 Sn+k-2 + \ldots + C1 Sn+1 + C0 Sn \quad (1)$$

where Sn+k is the output element, Cj are coefficients, k is a constant indicating the order of the recurrence relation, and n is an index in time. The state variables S and coefficients Cj are elements of the underlying finite field. After the new element is calculated in accordance with equation (1), the register is "shifted" by dropping the element Sn and inserting the newly calculated element Sn+k at the other end.

Figure 2:
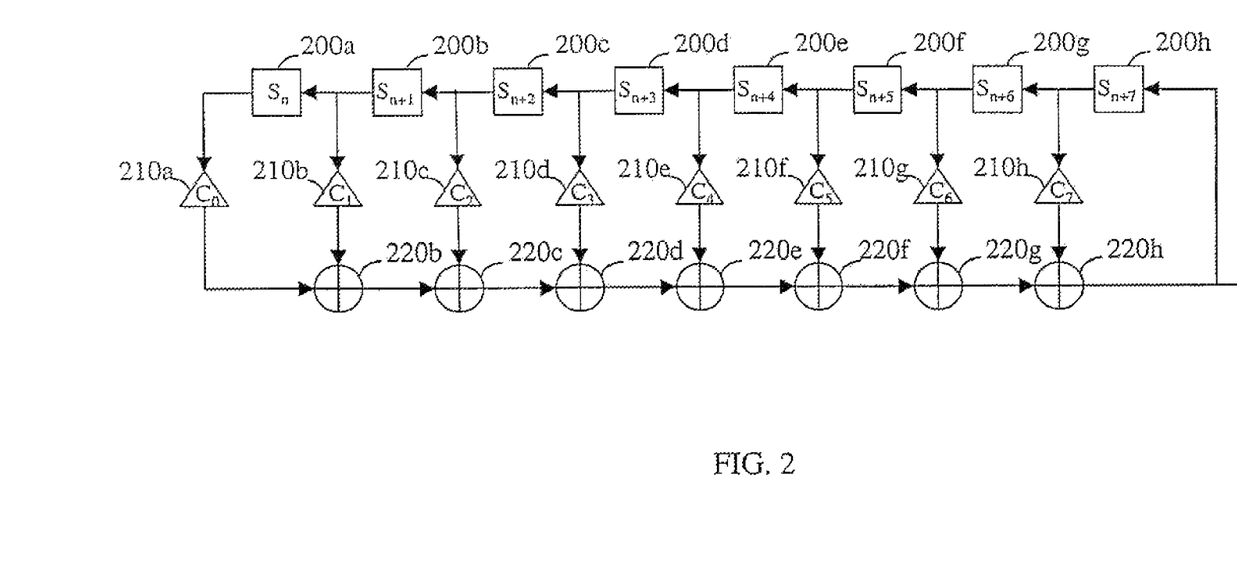
FIG. 2 is a block diagram of a general linear feedback shift register.

In one embodiment, the recurrence relation of equation (1) is implemented as shown in FIG. 2. The recurrence relation for a Galois field having 256 elements (2k, wherein k=8) is described for illustrative purposes but different finite fields can also be used. For a recurrence relation of order 256, registers 200a, 200b, 200c, 200d, 200e, 200f, 200g, 200h comprise eight elements Sn to Sn+7. The elements Sn to Sn+7 are provided to multipliers 210a, 210b, 210c, 210d, 210e, 210f, 210g, 200h that multiply the elements Sn to Sn+7 with the constants Cj, where 0<j<7. The resultant products from multipliers 210a, 210b, 210c, 210d, 210e, 210f, 210g, 210h are provided to adders 220a, 220b, 220c, 220d, 220e, 220f, 220g, 220h that sum the products to provide the output element.

Figure 3:
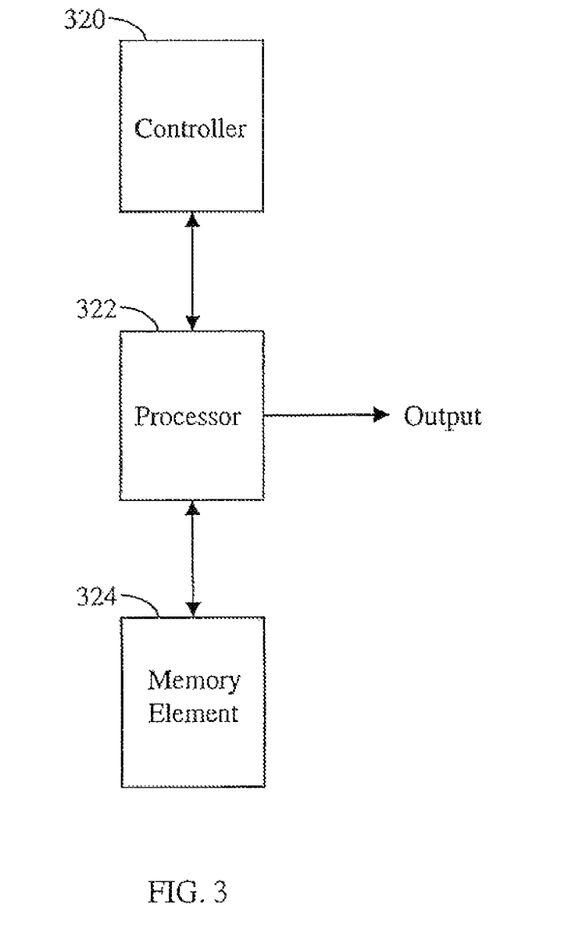
FIG. 3 is a block diagram of a stream cipher generator using a processor.

A block diagram of a stream cipher generator utilizing a processor is shown in FIG. 3. Controller 320 connects to processor 322 and comprises the set of instructions that directs the operation of processor 322. Controller 320 can comprise a software program or a set of microcodes. Processor 322 is the hardware that performs the manipulation required by the generator. Processor 322 can be implemented as a microcontroller, a microprocessor, or a digital signal processor designed to performed the functions described herein. Memory element 324 connects to processor 322 and is used to implement the linear feedback shift register and to store pre-computed tables and instructions. Memory element 324 can be implemented with random-access-memory or other memory devices designed to perform the functions described herein. The instructions and tables can be stored in read-only memory or random access memory or any other memory device. Only the memory for the register itself needs to be modified during the execution of the algorithm.

When a call is initiated between a mobile station and a base station, a secret key is negotiated between the two, which results in synchronization between the mobile station and the base station. Once the transmission is established between the mobile station and the base station, this negotiated secret key is used as a basis for encryption between the mobile station and any base station with which the mobile station may communicate during the call.

In one embodiment of the invention, the secret key is used with non-secret keying information in order to reinitialize the stream cipher currently being used by the mobile station. If the wireless telephone system has provisions to allow transmission of extra keying information from a first base station to a second base station, or transmission of extra keying information from a mobile station to a second base station, then the stream cipher can be reinitialized based upon a secret key and quasi-secret keying information.

Figure 4:
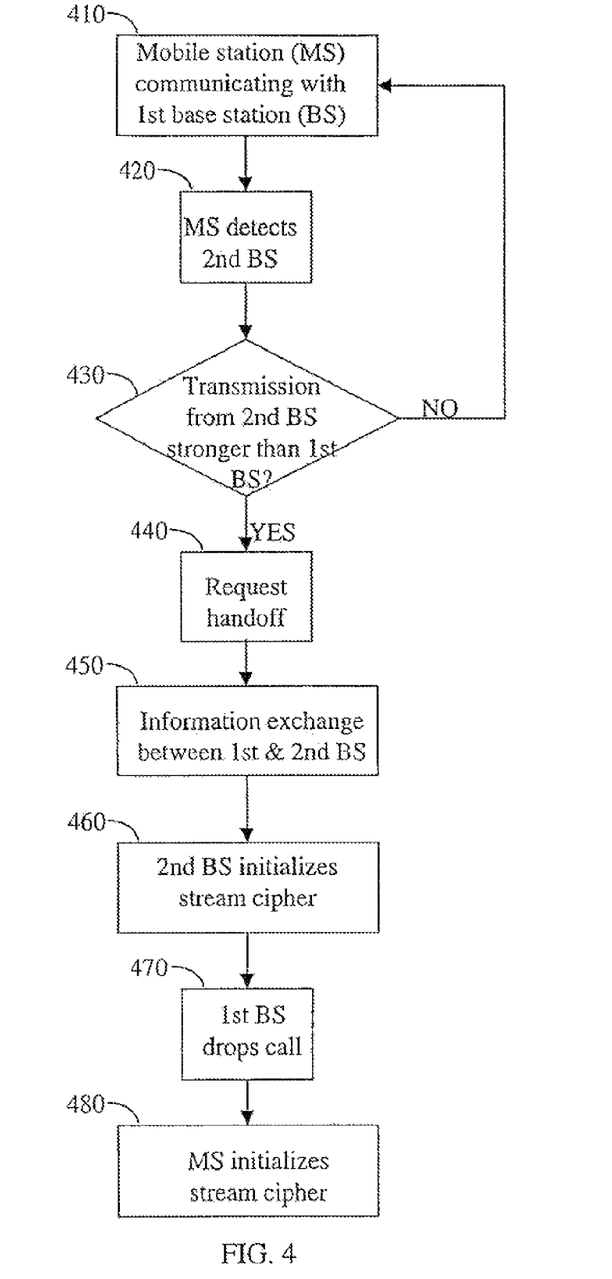
FIG. 4 is a flow chart of a handoff method that allows re-synchronization of a stream cipher.

FIG. 4 is a flow chart indicating the steps for reinitializing a stream cipher during handoff. Initially, in step 410, the mobile station is in secure communication with the first base station. In step 420, the mobile station is monitoring for broadcasts from other base stations and detects the presence of another base station. It should be noted that the mobile station can perform step 420 and step 410 at the same time. In step 430, the mobile station determines whether a second base station's broadcast has become sufficiently strong to justify a handoff to that second base station. If the second base station's broadcast is sufficiently strong, then the mobile station notifies the first base station that a handoff is required in step 440. If the second base station's broadcast is not sufficiently strong, then the mobile station maintains communications with the first base station as in step 410.

If the mobile station determines that a second base station's broadcast has become sufficiently strong in step 430 to request a handoff in step 440, the two base stations exchange all information necessary to achieve the handoff through the wireless telephone system in step 450. A negotiation process for a soft handoff is discussed in aforementioned U.S. Pat. No. 5,267,261. The handoff information is exchanged in an insecure manner except for the secret key. The secret key is held by the mobile station, the first base station, and the second base station, and is not otherwise distributed.

The second base station initializes the stream cipher based on the secret key and the quasi-secret keying information in step 460. The quasi-secret keying information can be any unique non-secret information that can be transmitted through the system. Since the non-secret information is unique, the stream cipher generator will not be reinitialized to a previous state. If the stream cipher generator were to be initialized to a previous state, then the resultant stream cipher would be the same stream cipher that was used by the mobile station and the first base station and the communication would not be secure.

In step 470, the first base station notifies the mobile station that the handoff can proceed and terminates communications with the mobile station. In Step 480, the mobile station initializes the stream cipher based on the secret key and the quasi-secret keying information and begins communications with the second base station.

There are a number of possible sources for generating the quasi-secret keying information. The quasi-secret keying information can be based on the number of times a handoff process has occurred during the course of the mobile station's encrypted transmission. In another embodiment of the invention, the quasi-secret keying information can be a random number broadcast from the second base station, described in the above-referenced U.S. Pat. No. 5,267,261, which discusses the soft handoff process. Since the mobile station must have received this broadcast in order to commence the soft handoff to the second base station, the quasi-secret keying information is easily accessible. This should not be done if the random number broadcasts are synchronized between the first and second base stations, as this would result in repeated use of the same encryption bit stream.

Another possible source for the quasi-secret keying information can be a random number created by the first base station. The first base station can generate a random number and broadcast the random number to both the mobile station and the second base station at the appropriate time. There are other sources of quasi-secret keying information, which are readily apparent to one skilled in the art. Any non-secret keying information that is unique, i.e. different, for each of the base stations with which the mobile station communicates can be used.

Figure 5:
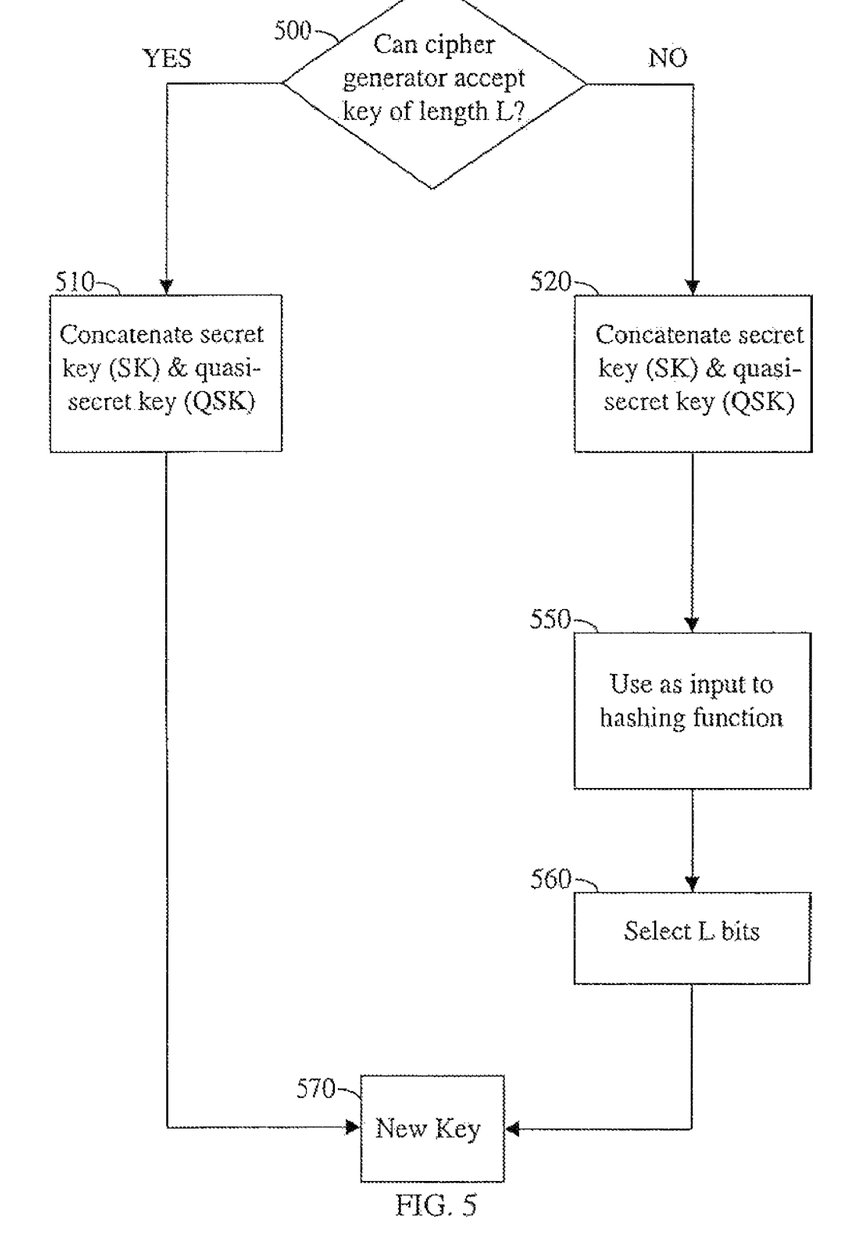
FIG. 5 is a flow chart of methods for creating new keys.

In one embodiment, the secret key is used with non-secret keying information in order to create a new key. FIG. 5 illustrates some methods of creating a new key. In step 500, if the stream cipher generator can accept a key that is longer than the sum of the lengths of the secret key and the quasi-secret keying information, the secret key and the quasi-secret keying information are concatenated serially in step 510. Once the secret key and the quasi-secret keying information are added together serially, the resultant product can be used as an entirely new key in step 570. If the stream cipher generator cannot accept a key that is longer than L bits, then in accordance with another embodiment, a new key is determined based upon the output of a hashing function. An exemplary hashing function is the Secure Hash Algorithm, specified in U.S. Federal Information Processing Standard 180-1. A hashing function is a function through which an input results in a deterministic output that is difficult to invert. The secret key and the quasi-secret keying information are concatenated serially in step 520 and the resultant product is used as an input to the secure hashing function in step 550. This function will yield an output with H bits, which can be longer or shorter than L bits, but will most likely be longer than L bits. (If H is not longer than L, it should be noted that the hashing function could be chained to produce more output.) If H is longer than L, the L leftmost bits of the output can be selected in step 560 as a new key in step 570. This new key will be the input to the stream cipher generator and the output will be a new stream cipher. It should be noted that the choice of L leftmost bits is arbitrary, and that any L bits of the output can be selected to form the new key.

Since the quasi-secret keying information is different from one base station to another, the new key derived from the various embodiments described above will also be unique. The same stream cipher will not (with extremely high probability) be generated twice, thus guaranteeing the security of the encrypted communications of the mobile station while travelling from one base station to another.

The above embodiments are described for the exemplary Galois finite field of order 256 ($2^8$). However, different finite fields can also be used such that the size of the elements matches the byte or word size of the processor used to manipulate the elements and/or the memory used to implement the shift register, or having other advantages. Thus, various finite fields having more than two elements can be utilized and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for initializing a new stream cipher during handoff of a mobile station, comprising:
    the mobile station communicating with a first base station in an encrypted manner using a first stream cipher generated based on a secret key;
    the mobile station requesting handoff to a second base station;
    the mobile station receiving quasi-secret keying information including a random number from the first base station;
    the mobile station generating a different key based on the secret key stored at the mobile station and the quasi-secret keying information including the random number;
    the mobile station initializing a new stream cipher based on the different key; and
    the mobile station communicating with the second base station in an encrypted manner using the new stream cipher.

2. A method as defined in claim 1, wherein the quasi-secret keying information comprises unique non-secret information.

3. A method as defined in claim 1, wherein the different key is generated based on the secret key and the quasi-secret keying information using a hashing function performed on the secret key serially concatenated with the quasi-secret keying information.

4. A processor configured to execute instructions associated with a method for initializing a new stream cipher during handoff of a mobile station, the method comprising:
    communicating with a first base station in an encrypted manner using a first stream cipher generated based on a secret key;
    requesting handoff to a second base station;
    receiving quasi-secret keying information including a random number from the first base station;
    generating a different key based on the secret key stored at the mobile station and the quasi-secret keying information including the random number;
    initializing a new stream cipher based on the different key; and
    communicating with the second base station in an encrypted manner using the new stream cipher.

5. A processor as defined in claim 4, wherein the quasi-secret keying information comprises unique non-secret information.

6. A processor as defined in claim 4, wherein the different key is generated based on the secret key and the quasi-secret keying information using a hashing function performed on the secret key serially concatenated with the quasi-secret keying information.

7. A non-transitory memory element having stored instructions for initializing a new stream cipher, which instructions, when executed by a processor in a mobile station, cause the mobile station to:
    communicate with a first base station in an encrypted manner using a first stream cipher generated based on a secret key;
    request handoff to a second base station;
    receive quasi-secret keying information including a random number from the first base station;
    generate a different key based on the secret key stored at the mobile station and the quasi-secret keying information including the random number;
    initialize a new stream cipher based on the different key; and
    communicate with the second base station in an encrypted manner using the new stream cipher.

8. A non-transitory memory element as defined in claim 7, wherein the quasi-secret keying information comprises unique non-secret information.

9. A non-transitory memory element as defined in claim 7, wherein the different key is generated based on the secret key and the quasi-secret keying information using a hashing function performed on the secret key serially concatenated with the quasi-secret keying information.

* * * * *